March 27, 1928. 1,664,078
J. F. LAVERY
BROADCAST FERTILIZER DISTRIBUTOR
Filed Dec. 15, 1925   2 Sheets-Sheet 1
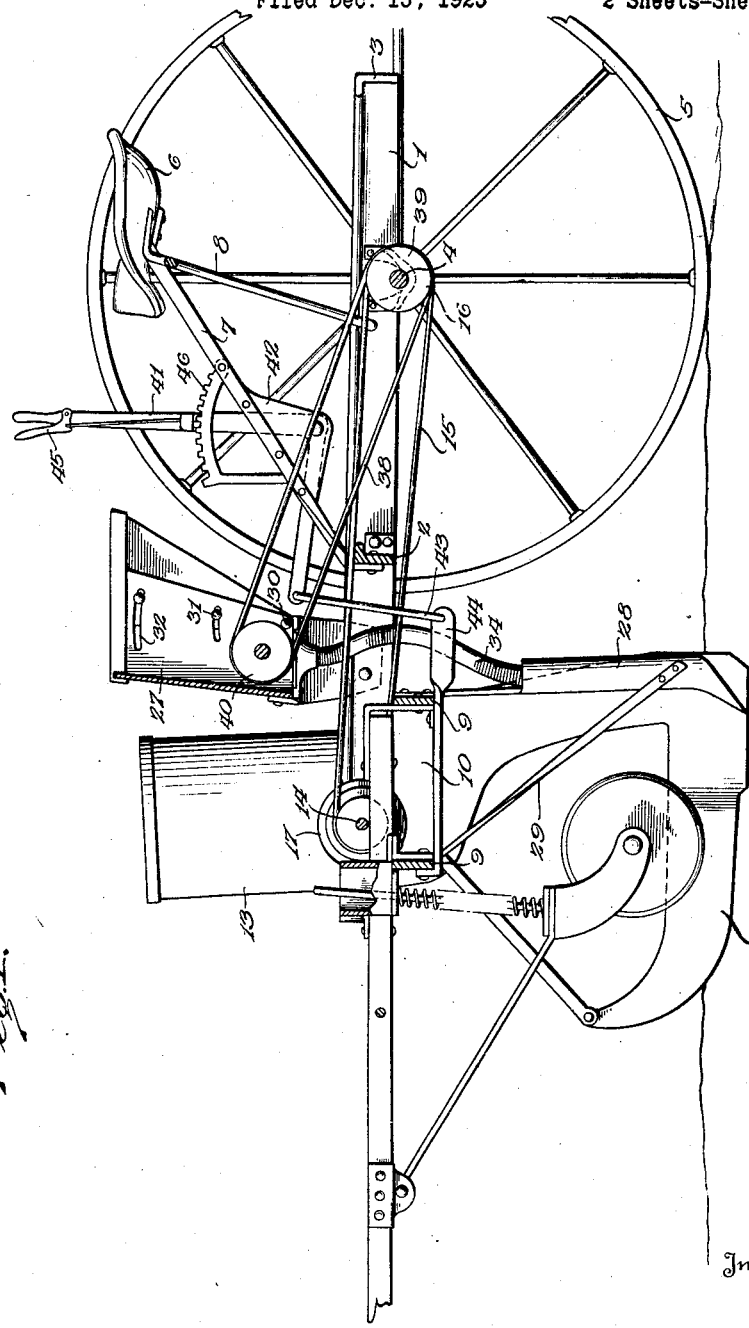
Inventor
J. F. Lavery
By Lacey & Lacey, Attorneys March 27, 1928.
J. F. LAVERY
1,664,078
BROADCAST FERTILIZER DISTRIBUTOR
Filed Dec. 15, 1925  2 Sheets-Sheet 2
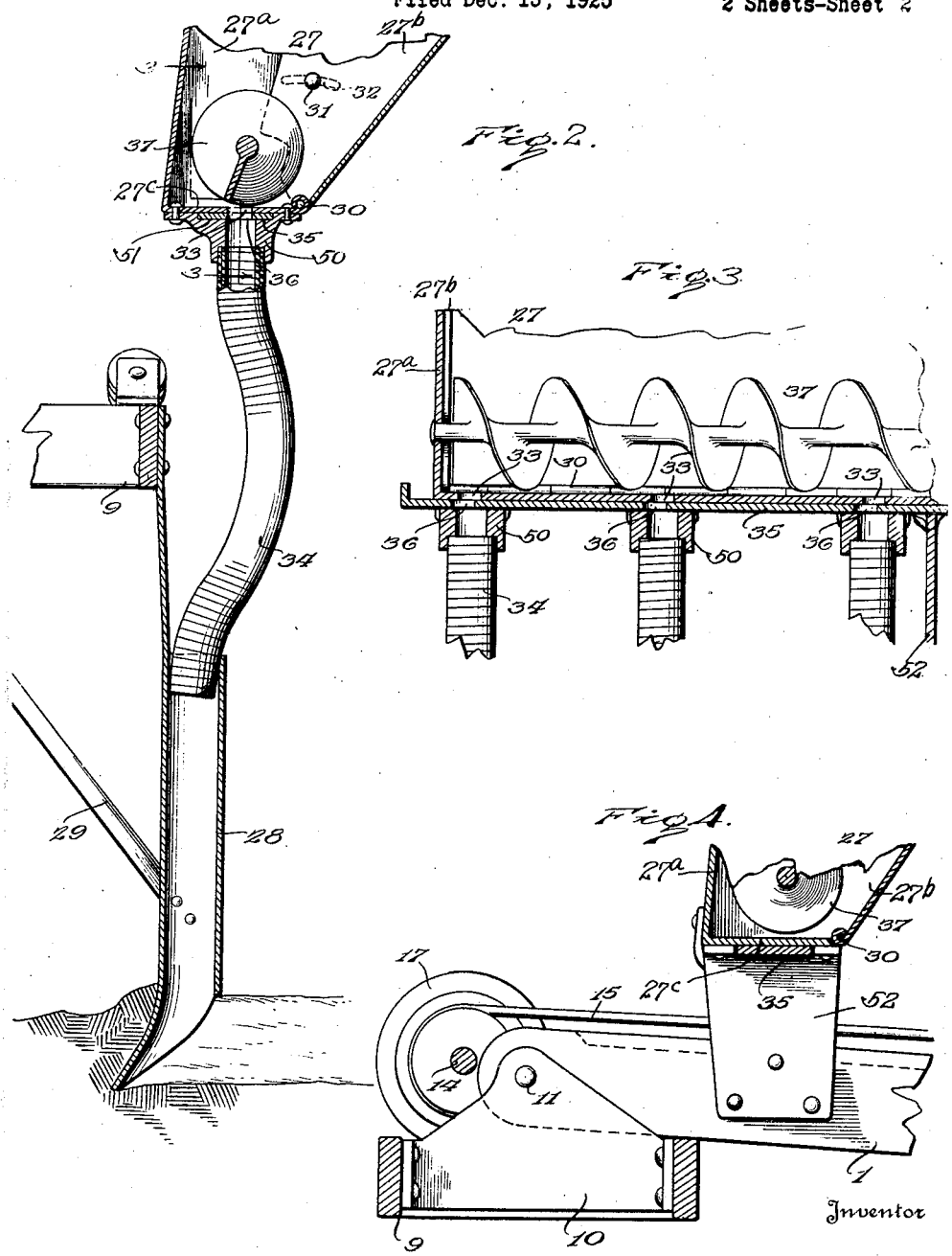
Inventor
J. F. Lavery
By
Attorneys Patented Mar. 27, 1928.

1,664,078

UNITED STATES PATENT OFFICE.

JOHN F. LAVERY, OF GREENFIELD, OHIO.

BROADCAST FERTILIZER DISTRIBUTOR.

Application filed December 15, 1925. Serial No. 75,594.

In the growing of corn it has been demonstrated that the best results and largest crops have been attained by distributing the fertilizer broadcast and, from an economical standpoint, it is desirable that the seed and fertilizer be distributed at the same time.

The primary object of the invention is the provision of a mechanism in the nature of an attachment, which may be readily adapted to a corn planter for distributing fertilizer broadcast simultaneously with the sowing of the corn in the furrows.

Another object of the invention is to provide the attachment with an improved type of fertilizer containing hopper so constructed that it may be adjusted to accommodate itself to corn planters of conventional constructions and at the same time retain feeding means within the hopper in proper relation to outlets in the bottom of the hopper.

While the drawings illustrate a preferred embodiment of the invention it is to be understood that in adapting the means to meet specific needs and requirements the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1 is a vertical, longitudinal, sectional view through a corn planter with the improved fertilizer distributor applied thereto, Figure 2 is an enlarged detail sectional view through the fertilizer distributor, Figure 3 is a detail sectional view on the line 3—3 of Figure 2 looking in the direction of the arrows, and, Figure 4 is an enlarged detail sectional view through the lower portion of the hopper and adjacent portions of the corn planter.

Corresponding and like parts are referred to in the following description and designated in the several views of the drawings by like reference characters.

The corn planter to which the fertilizer has been shown applied comprises a wheel frame and a runner frame, the two frames being pivotally connected to admit of relative adjustment according to varying conditions met with in planting. The wheel frame comprises side bars 1, and cross bars 2 and 3. An axle 4 is mounted in suitable bearings applied to the side bars 1 and is provided with ground wheels 5 which may be connected thereto in any manner to cause rotation of the axle as the planter is drawn over the field. The usual seat 6 is mounted upon members 7 and 8, the member 8 being attached to the side bars 1 and the member 7 extending forwardly from the seat at a downward incline and having its forward end attached to the cross bar 2.

The runner frame comprises a transverse rectangular frame 9 disposed in advance of the wheel frame and provided with intermediate crosspieces 10 to which the front ends of the side bars 1 of the wheel frame are pivoted, as indicated at 11 in Fig. 4. The runners 12, which may be of any preferred construction, are connected to the frame 9 and are disposed to form the furrows in which the corn is dropped in check rows in a manner well understood. The hoppers 13 containing the seed may be of any formation and are mounted upon the frame 9 in line with the runners 12 and the seed may be delivered from the hoppers in any determinate way according to the design and specific construction of the planting mechanism. The numeral 14 designates a transversely arranged shaft for operating the seed dropping mechanism and this shaft derives power from the axle 4 by means of a drive belt 15 which passes around a cone pulley 16 fast to the axle 4 and a cone pulley 17 fast to the shaft 14. Obviously the feeding mechanism may be operated in any preferred way.

The fertilizer distributor comprises a hopper, which, in the preferable construction, is mounted upon the wheel frame and drills 28 which are attached to the runner frame to be carried thereby. The hopper is designated by the numeral 27 and, for convenience, is made in sections so that the space formed between the inner ends of the sections may be utilized to receive a portion of the operating mechanism whereby positive discharge of the fertilizer is effected. The drill teeth 28, which may be of any construction, are attached to the rear portion of the frame 9 and are staid by braces 29 extending from the lower ends of the drill teeth to the front portion of the frame 9, as shown most clearly in Figure 3. The hopper 27 comprises front and rear sections which are adjustably connected, thereby admitting of ready adaptation of the fertilizer distributor to different makes of corn planters. The front and rear sections comprising the hopper 27 are pivotally connected at their lower ends, as indicated at 30, and the end walls of the sections overlap and one of the walls is supplied with bolts 31 and the companion wall is formed with slots 32 in which the bolts 31 operate and in this manner the two sections of the hopper are made secure when properly adjusted. Openings 33 are formed at determinate intervals in the bottom of the hopper for discharge of the fertilizer and these openings are connected by flexible tubes 34 with the drill teeth 28 and the effective size of the openings 33 may be regulated to control the delivery of the fertilizer by means of a cutoff 35 which consists of a plate slidably mounted against the lower side of the bottom of the hopper and provided at intervals in its length with openings 36 in position to register with the openings 33. By moving the cutoff 35, the discharge openings 33 may be regulated to deliver the fertilizer in regulated quantity as may be required. An auger, or screw conveyer 37, is located in the lower portion of the hopper 27 and serves to agitate the fertilizer and insure a positive discharge thereof. The front section 27ᵃ of the hopper has the bottom 27ᶜ formed therewith. The conveyer 37 in journaled in the end walls of the front section, hence the conveyer maintains a fixed relation to the discharge openings 33. A collar 50 is attached to the bottom 27ᶜ of the hopper opposite each of the discharge openings 33 and a tube 34 is coupled thereto in any determinate way. These collars 50 are recessed in their upper end, as indicated at 51, to receive the cutoff 35 which is retained in place thereby against the bottom of the hopper. Uprights 52 connect the hopper with the bars 1 of the wheel frame.

The fertilizer distributor is positively operated from the axle 4 by means of a drive belt 38 which cooperates with a pulley 39 fast to the axle 4 and a pulley 40 fast to the shaft of the screw conveyer 37, the pulley 40 and the front portion of the drive shaft 38 being disposed in the space formed between the inner ends of the sections comprising the hopper 27. For adjusting the runner frame, a bell crank lever 41 is mounted upon a bracket 42 attached to the brace 7 and its longitudinal arm is connected by means of a link 43 with an arm 44 projecting rearwardly from the frame 9. The lever 41 is provided with a hand latch 45 which cooperates with a toothed portion 46 of the bracket 42 whereby the runner frame is held in the required adjusted position. The lever 41 extends within convenient reach of the driver's seat 6 so that adjustment of the runner frame may be effected at any time without requiring the driver to dismount.

The fertilizer distributor may be readily applied to any make of corn planter and admits of fertilizer being distributed broadcast simultaneously with the planting of the corn and it is observed that the drill teeth deliver the fertilizer into the furrows, thereby preventing the fertilizer from being scattered by the wind. The flexible tubes 34 admit of adjustment of the runner frame when it is required to regulate the depth of the seed and fertilizer receiving furrows. It is observed that the delivery of the seed and fertilizer may be cutoff when reaching the end of a row by any usual or preferred mechanism common in the art.

Having thus described the invention, I claim:

1. A hopper of the character described comprising companion front and rear sections, said front section having a bottom formed with outlet openings, and front and end walls rigid with and extending upwardly from its bottom, said rear section having a rear wall pivoted at its lower end to the bottom of the front section whereby the rear section may be swung towards the front section from a position extending upwardly at a rearward incline to a substantially vertical position and end walls rigid with the rear wall and overlapping the end walls of the front section, the end walls of one section having slots formed transversely therein, and fasteners passed through the end walls of the other section and through said slots to limit swinging movement of the rear section and releasably hold the rear section in a set position.

2. A hopper of the character described comprising companion front and rear sections, said front section having a bottom formed with outlet openings, and front and end walls rigid with and extending upwardly from its bottom, said rear section having a rear wall pivoted at its lower end to the bottom of the front section whereby the rear section may be swung towards the front section from a position extending upwardly at a rearward incline to a substantially vertical position and end walls rigid with the rear wall and overlapping the end walls of the front section, means to releasably retain the rear section in a set position, means to feed material to the outlet openings in the bottom of the front section disposed in the hopper and supported by the end walls of the front section in operative relation to the outlets, and closure means for the outlets movable into and out of closing relation thereto.

In testimony whereof I affix my signature.

JOHN F. LAVERY. [L. S.]